US008889058B2

(12) United States Patent
Kienzle et al.

(10) Patent No.: US 8,889,058 B2
(45) Date of Patent: Nov. 18, 2014

(54) METHOD AND DEVICE FOR SILICONIZATION OF CARBON-CONTAINING MATERIALS

(75) Inventors: Andreas Kienzle, Balgheim-Möttingen (DE); Johann Daimer, Mörfelden-Walldorf (DE); Rudi Beck, Mönchsdeggingen (DE); Otto Mederle, Meitingen (DE)

(73) Assignee: Audi AG, Ingolstadt (DE)

( * ) Notice: Subject to any disclaimer, the term of this patent is extended or adjusted under 35 U.S.C. 154(b) by 847 days.

(21) Appl. No.: 12/212,452

(22) Filed: Sep. 17, 2008

(65) Prior Publication Data

US 2009/0149308 A1    Jun. 11, 2009

(30) Foreign Application Priority Data

Sep. 19, 2007 (DE) .......................... 10 2007 044 783

(51) Int. Cl.
*C04B 35/64* (2006.01)
*C04B 35/573* (2006.01)
*F27B 9/04* (2006.01)
*F27B 9/24* (2006.01)
*F27B 9/36* (2006.01)
*F27D 3/02* (2006.01)

(52) U.S. Cl.
CPC ............ *C04B 35/64* (2013.01); *C04B 35/573* (2013.01); *F27B 9/047* (2013.01); *F27B 9/2407* (2013.01); *F27B 9/36* (2013.01); *F27D 3/02* (2013.01); *F27D 3/026* (2013.01); *C04B 2235/40* (2013.01); *C04B 2235/402* (2013.01); *C04B 2235/404* (2013.01); *C04B 2235/405* (2013.01); *C04B 2235/6565* (2013.01); *C04B 2235/6581* (2013.01); *C04B 2235/661* (2013.01); *C04B 2235/662* (2013.01)

USPC .......................................................... 264/682

(58) Field of Classification Search
USPC .......................................................... 264/682
See application file for complete search history.

(56) References Cited

U.S. PATENT DOCUMENTS 6,231,791 B1 *  5/2001  Heine et al. .................. 264/29.5
6,449,456 B1 *  9/2002  Cahill et al. .................. 399/325

(Continued)

FOREIGN PATENT DOCUMENTS

DE    10 2006 009 388 A1    9/2007
EP           0453592        * 10/1991

(Continued)

*Primary Examiner* — Joseph S Del Sole
*Assistant Examiner* — Russell Kemmerle, III
(74) *Attorney, Agent, or Firm* — Novak Druce Connolly Bove + Quigg LLP

(57) ABSTRACT

Method for treatment of workpieces of porous carbon material with liquid silicon with the formation of silicon carbide, comprising the following steps: preheating of porous carbon workpieces under an inert gas to a selected operating temperature $T_B1$, delivery of liquid silicon to the porous carbon workpieces at an operating pressure $p_B2$ and an operating temperature $T_B2$ and impregnation of the porous carbon workpieces with liquid silicon, reaction of the liquid silicon in the workpiece at a temperature $T_B3$ with formation of silicon carbide from carbon and silicon, gassing of the workpieces with inert gas, and cooling from the operating temperature $T_B3$ to a conditioning temperature $T_k$, cooling of workpieces to room temperature, in step c the delivery of silicon and transport of the workpieces taking place over preferably cylindrical rolls which are porous at least in the exterior region and which are pivoted, and their speed of rotation determining the residence time for the delivery of silicon in step c, and the temperature $T_B3$ being greater than or equal to the temperature $T_B2$, and the workpieces for process step d no longer being in contact with liquid silicon outside the workpieces.

6 Claims, 2 Drawing Sheets

(56) References Cited

U.S. PATENT DOCUMENTS 6,514,562 B1* 2/2003 Clark et al. .................. 427/140
2005/0182206 A1* 8/2005 Pickering ..................... 525/474

FOREIGN PATENT DOCUMENTS

EP 0864548 A2 9/1998
EP 1829843 A2 9/2007

* cited by examiner

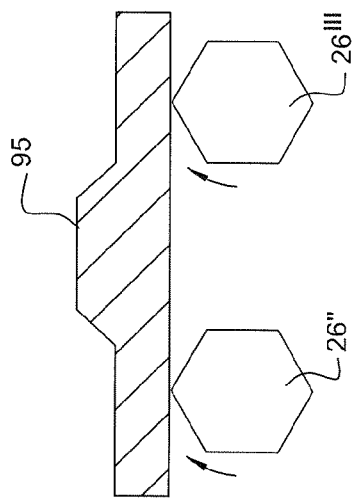
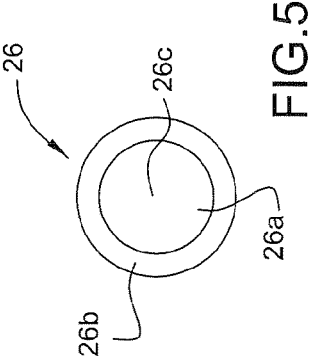
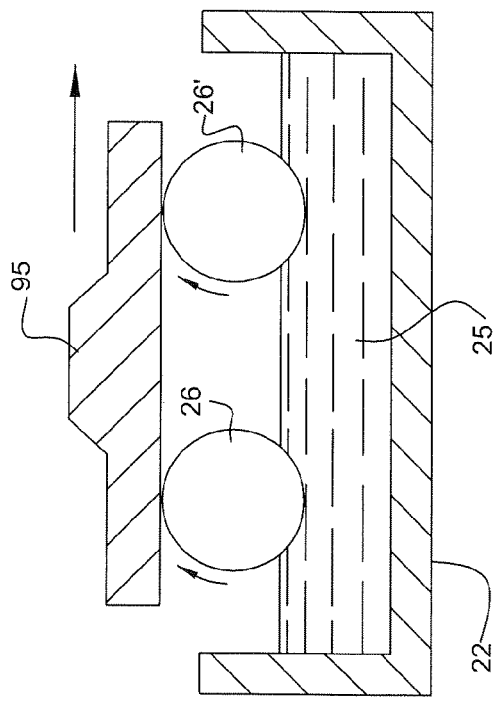
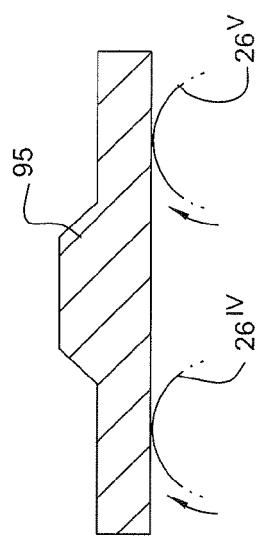

METHOD AND DEVICE FOR SILICONIZATION OF CARBON-CONTAINING MATERIALS

CROSS-REFERENCE TO RELATED APPLICATION

This application claims priority from German Patent Application No. 10 2007 044 783.5 filed on Sep. 19, 2007, the entire disclosures of which are hereby incorporated by reference.

BACKGROUND OF THE INVENTION

This invention relates to a method for siliconization of carbon-containing materials and a device adapted to this purpose.

A method for siliconization of carbon-containing materials was described by a working group of the DLR (Deutsche Forschungsanstalt für Luft-und Raumfahrt e.V. [German Aerospace Center]), Stuttgart, Institute of Structures and Design, at the VDI [Association of German Engineers] Materials Conference in Duisburg from Mar. 9 to 10, 1994. Carbon materials reinforced with carbon fibers were infiltrated with molten silicon by means of a so-called "liquid siliconization process." The elementary silicon reacts with carbon to form silicon carbide by heat treatment. Structural components and in particular also friction bodies for brake and clutch systems in motor vehicles can be produced from these materials.

Similar methods are described, for example, in EP 0 956 276, the carbon workpieces to be siliconized and suitably bound powdered silicon being heated together, the molten silicon penetrating into the carbon workpieces and reacting with the carbon at least partially to form silicon carbide.

The described methods are batch methods in which conversion of carbon materials into materials with a silicon carbide-containing matrix takes place batch by batch. In this case the furnaces in which the silicon is melted and in which the reaction of liquid silicon with carbon into silicon carbide is effected, must first be charged, heated under an inert gas atmosphere and optionally evacuated, and after the reaction to silicon carbide must be cooled with the holding time necessary for this purpose and unloaded. These methods require long heating and cooling times and are unfavorable with respect to energy use.

A favorable method therefore comprises treatment of workpieces of porous carbon which is optionally reinforced with fibers, preferably carbon fibers, with liquid silicon, which treatment can be carried out continuously or semicontinuously in a cyclic manner, with at least partial conversion of the carbon into silicon carbide. Such a continuous or semicontinuous method for siliconization is described in application DE 10 2006 009 388.7. But the siliconizing step is discontinuous, the body to be impregnated is seated on wicks, and is not transported during silicon infiltration. The delivery of silicon is also nonuniformly distributed by the wicks over the support surface; this can lead to inhomogeneity of the impregnated body. Therefore the object is to devise a continuous method also for the step of siliconization, that is, delivery of liquid silicon to workpieces of porous carbon which have optionally been reinforced with fibers, preferably those of carbon, and the subsequent reaction of the silicon which has been taken into the workpieces with at least part of the carbon in the workpieces to silicon carbide.

The object is achieved by a process which comprises the following steps:
a) preheating of porous carbon workpieces reinforced optionally with fibers under an inert gas, proceeding from room temperature to a selected operating temperature $T_B1$,
c) delivery of liquid silicon to the porous carbon workpieces at an operating pressure $p_B2$ and an operating temperature $T_B2$ and impregnation of the porous carbon workpieces with liquid silicon,
d) reaction of the liquid silicon which has penetrated into the workpieces with carbon in the workpieces at a temperature $T_B3$ with formation of silicon carbide,
e) gassing of the workpieces with inert gas and cooling from the operating temperature $T_B3$ to a conditioning temperature $T_k$ with continuation of the reaction and reduction of the stresses formed in the workpieces,
f) cooling of workpieces to room temperature,
in step c the delivery of silicon and transport of the workpieces taking place over preferably cylindrical rolls which are porous at least in the exterior region and which are pivoted, and their speed of rotation determining the residence time for the delivery of silicon in step c and the initial reaction of the silicon with the carbon with the formation of silicon carbide, and the temperature $T_B3$ being greater than or equal to the temperature $T_B2$, and the workpieces for process step d no longer being in contact with liquid silicon outside the workpieces.

SUMMARY OF THE INVENTION

In the process the porous rolls act like wicks which absorb the liquid silicon, for example, from a bath, and deliver it to the workpieces. Preferably the porous rolls with their underside dip into a reservoir with liquid silicon, the pores of the rolls being at least partially filled with liquid silicon, and release the silicon at least partially to the overlying porous carbon workpieces, after rotation by the angle of rotation necessary for this purpose, the workpieces resting on the top side of the roller at least punctiform, in the case of cylindrical rolls and workpieces with a planar undersurface in the form of segments, and in the case of prismatic rolls with a polygonal cross section and workpieces with a planar undersurface, in laminar form.

According to the invention it is also possible to make the rolls not cylindrical, but polygonal in the exterior region (jacket region), for example, as an axially-symmetrical prism with at least three, preferably at least four, and preferably up to eight jacket surfaces, the edges which are parallel to the axis preferably being rounded.

The method can be continuously applied with the roll wicks according to the invention. For a continuous method there are continuously working sluices, in particular cellular wheel sluices, between the individual chambers O.

A further object of this invention is an adapted device for executing the method, consisting of at least four chambers O1 to O4 which are interconnected by sluices, and each of the chambers can be heated, cooled, evacuated independently of their neighbors and can be filled or flushed with suitable gasses. Each of the chambers $O_i$ is provided with at least one transport or conveyor means, by means of which the workpieces are transported from the previous chamber $O_{i-1}$ into chamber $O_i$ and from chamber $O_i$ into the following chamber $O_{i+1}$, for example, in the embodiment with 4 chambers $O_{i=8}$ is the inlet and $O_{i=5}$ is the outlet of the arrangement consisting of four chambers. In the case of four chambers the subscript i can assume values 1, 2, 3, and 4. The inlet (first sluice) and the outlet (last sluice) are designated as O0 and O5 here for simplification. The transport device in the chamber provided for infiltration with liquid silicon comprises a shaft and rolls of porous material attached to it and referred to as roll wicks, the workpiece on the top side of the rolls being transported by the rotary motion of the rolls, and the rolls on their underside dipping into a bath with liquid silicon. Preferably the roll wicks are made from porous carbon (CFC) reinforced with carbon fibers. It is especially preferred that the roll wicks be guided in boron nitride supports.

Three-dimensional separation of the individual process steps and continuous or cyclic semicontinuous conveyance of the workpieces into chambers separated from one another and the exterior by sluices make it possible to have the operating state (temperature, pressure) in the individual chambers as constant as possible; this leads to uniform operating states, a reduction of energy consumption, and higher flexibility in production. Conveyance or transport of the workpieces outside the chambers intended for siliconization can take place by prior art means and methods, for example, by sliding or conveying by means of a slide, by transport on rolls, by means of one or more lifting beams, or on a link chain. In this connection materials for the transport means are used which withstand the selected temperatures and the media used, for example, chosen from graphite and other carbon materials which can be reinforced with fibers, for example, of carbon, and also materials of boron nitride or refractory materials which are coated with boron nitride.

In this context steps a and b and steps d and e can each be carried out in a common chamber, while otherwise there is at least one separate chamber for each of the process steps.

Heating in the chambers is done with prior art heating devices, in particular infrared radiators, inductive heating units, microwave heating and heating by warmed gas (inert gas). Cooling takes place by flow of a cooled gas stream through the pertinent chambers, at higher temperatures inert gases such a nitrogen and argon being preferred, while at temperatures of at most 300° C. air can also be used.

It is preferred that induction heating be used in the chamber O1 since this type of heating can deliver large amounts of energy into the workpiece very quickly.

The device is explained by the drawings.

BRIEF DESCRIPTION OF THE DRAWINGS

FIG. 2 shows an extract from the second chamber O2 as shown in FIG. 1, with detailed representation of the support of the workpiece 95 on (two illustrated) cylindrical roll wicks 26 which are porous at least in the exterior region and which with their lower part dip into a bath with liquid silicon, and which guide the liquid silicon to the workpiece 95, FIG. 3 shows two unrounded roll wicks in the form of hexagonal prisms, and FIG. 4 shows a modified extract from FIG. 3, instead of the unrounded prism edges a respective rounded prism edge each being shown, and FIG. 5 shows a section through a cylindrical roll wick, the inner part being made solid and the outer part porous.

DETAILED DESCRIPTION OF THE PREFERRED EMBODIMENT OF THE INVENTION

Figure 1:
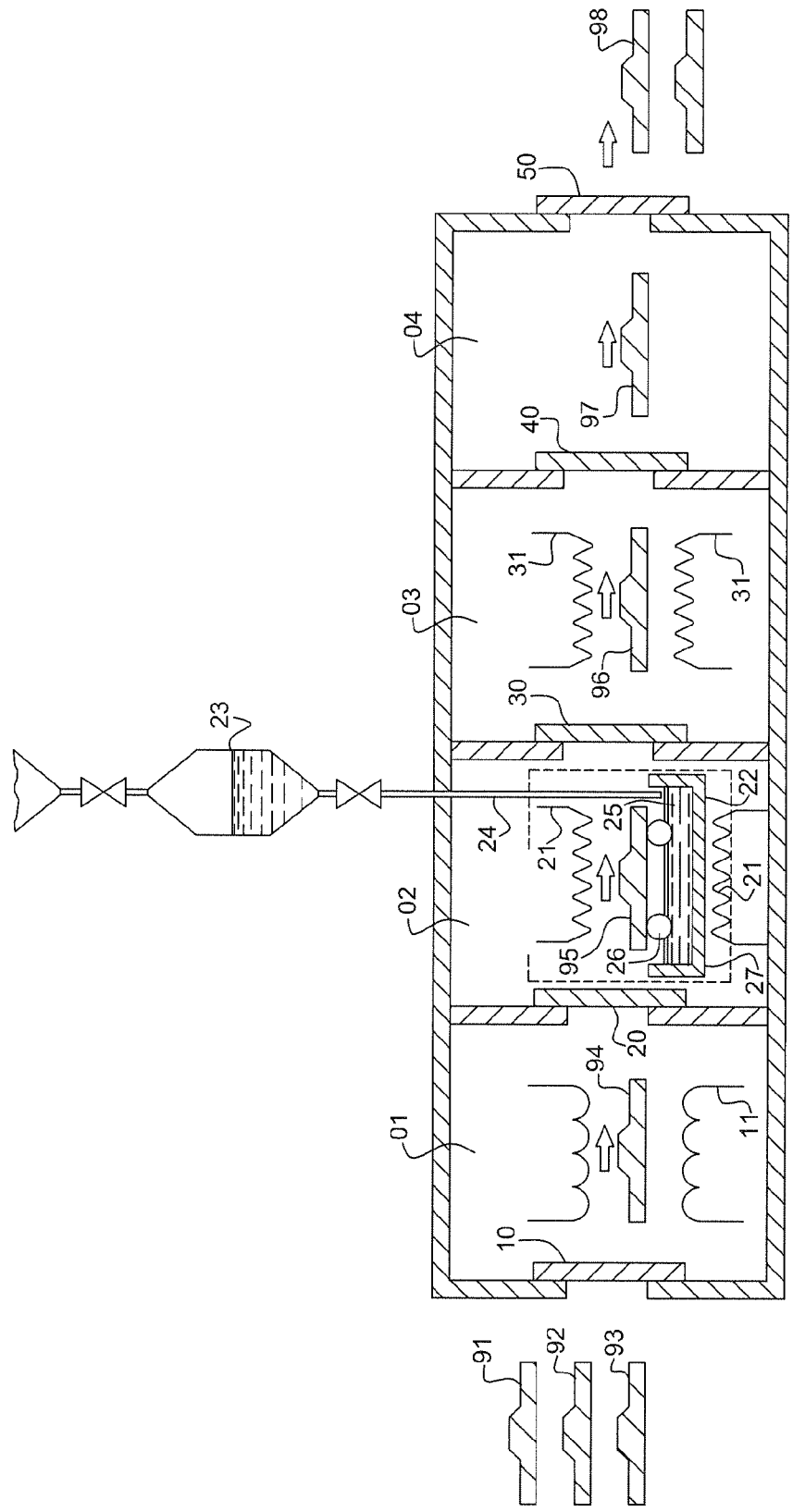
FIG. 1 shows a schematic section through an arrangement with four chambers, for the sake of greater clarity the feeds and discharges for the gases used are not shown.

According to the invention, in the device shown in FIG. 1 consisting of four chambers, the method proceeds such that the workpieces are introduced into the first chamber O1 through the sluice 10 from the outside in succession, here shown as those to be introduced next and designated as 91, 92 and 93. After closing the sluice 10, the chamber O1 according to process step a is flushed with an inert gas surge, preferably with nitrogen or argon, after displacing the air by means of optionally several sequences of inert gas flushing and evacuation the workpiece 94 which is already in the chamber is heated preferably by induction heating 11 from room temperature to the operating temperature $T_B1$, which can be from 1300° C. to 1800° C., preferably 1350° C. to 1750° C. Preferably the operating pressure of 1 bar (external pressure, $10^5$ Pa) is reduced to a value $p_B1$ of preferably at most 100 mbar (100 hPa), especially preferably to 50 hPa (50 mbar), and in particular at most 20 mbar (20 hPa). This pressure reduction according to process step b can take place before heating, during heating, or after heating.

At latest before opening the sluice 20, in the chamber O1 a negative pressure is produced, as also preferably continuously prevails in the chamber O2, preferably under 10 hPa (10 mbar) in particular less than 1 Pa ($10^{-2}$ mbar).

When this pressure is reached, the workpiece is transported through the sluice 20 into the chamber O2, where it is now designated as 95. After closing the sluice 20 a new workpiece is introduced from the outside through the sluice 10 into the chamber O1 and is heated as described above.

In the chamber O2 the workpiece 95 is held by a transport device which is not shown at an operating pressure $p_B2$ of at most approx. $10^{-2}$ mbar (1 Pa) and at an operating temperature $T_B2$ of 1450° C. to 1700° C. which can be set via the heating unit 21, and is seated on the roll wicks 26 which are located in the siliconization device 27. In this siliconization device 27, according to process step c, the liquid silicon 25 in a basin 22 travels into the carbon workpiece 95 via the roll wicks 26 which are porous at least in the exterior region. At a temperature of between 1450° C. and 1700° C. which prevails in the chamber, the silicon penetrates into the pores of the workpiece 95 and reacts at least partially according to process step d with the carbon present in the workpiece to form silicon carbide. The workpiece is referred to as a "siliconized workpiece" after this treatment.

FIG. 2 shows a detail of the chamber O2 in which a workpiece 95 is transported on two cylindrical roll wicks 26 and 26'. The roll wicks dip with their lower part into a trough 22 with molten silicon 25. FIG. 3 shows a similar arrangement with the trough and the liquid silicon omitted, there being two roll wicks 26" and 26''' here in the form of hexagonal prisms with sharp, unrounded edges; FIG. 4 shows a similar arrangement in which there are roll wicks $26^{IV}$ and $26^{V}$ with rounded prism edges. FIG. 5 shows a section through a cylindrical roll wick 26, with an axle 26c which is coated with a layer of boron nitride preferably at least in the region in which it may come into contact with silicon, and a solid inner part 26a and a porous outer part 26b.

The residence time of the workpieces to be siliconized in the chamber O2 can be chosen based on the speed of rotation of the roll wicks and the overall length of the chamber O2. The amount of silicon introduced into the workpiece for a given porosity of the roll wicks and of the workpiece and temperature is dependent on the peripheral speed and the thickness (radius) of the roll wicks 26, on the thickness of the porous part 26b in FIG. 5 of the roll wicks, and on the degree of filling of the roll wicks; it can also be adapted by the number of roll wicks or the size of the planar parts of the jacket surface of the roll wicks being varied for prismatic roll wicks. For the prismatic roll wicks one preferred embodiment is to turn these roll wicks, not with a constant angular velocity, but to use cyclic rotation such that for full-surface contact between the jacket plane of the prismatic roll wick and the undersurface of the workpiece a rest phase or pause is introduced with a selectable duration which can be predetermined and then rotation is re-started until the next full-surface contact. Longer contact in simple form facilitates delivery of larger amounts of silicon. The length of the rest phase is selected according to the required amount of silicon to be introduced. After siliconization in chamber O2, the siliconized workpiece 95 is lifted off the roll wicks and transported through the sluice 30 into the chamber O3.

Preferably the material and/or the porosity of the rolls is chosen such that a flow of silicon from the porous rolls into the workpiece to be impregnated is ensured. In this connection, particularly rolls of porous carbon which is reinforced with carbon fibers have proven effective. In one preferred embodiment as shown in FIG. 5, it is possible to make the roll wicks 26 from a solid material 26a, and to use a porous material 26b only in the exterior region (far from the axis of rotation of the rolls). A suitable porous material preferably has an open porosity which is preferably at least 30% of the volume of the material. The average pore diameter (determined by evaluation of microphotographs) there is preferably at most 10μ. The diameter of the rolls is preferably in the range from 150 mm to 300 mm.

The level of the liquid silicon in the basin 22 is preferably continuously supplemented to a preset value, this function is performed by a reservoir 23 with liquid silicon which is connected by a pipe 24 to the basin 22.

In the chamber O3 the reaction according to process step d in the siliconized workpiece is completed to the desired degree optionally by further heating with the heating unit 31, the three-dimensional separation from the chamber O2 favorably enabling the temperature of the workpiece in chamber O3 to be set at a temperature $T_B3$ above the temperature $T_B2$ without the risk that silicon will escape from the basin 22, as in the selection of a higher temperature in the chamber O2 due to the higher vapor pressure. In experiments underlying this invention it was ascertained that the silicon which had been sucked into the pores of the workpiece (now 96) has a much lower vapor pressure than the silicon in the bath 22 at the same temperature.

One preferred temperature range for this after reaction is from 1500° C. to 2000° C., especially preferably from 1600° C. to 1900° C., and especially from 1700° C. to 1800° C. The formation of silicon carbide can thus proceed much more quickly; this leads to the desired shortening of the cycle times in the method according to the invention.

Heating in the chambers O2 and O3 takes place preferably by radiation heating, for example, with graphite heaters 21 and 31 that have been caused to glow with Joulean heat.

As soon as the reaction to form silicon carbide has taken place to the desired degree, the workpiece in the chamber O3 is cooled by blowing in cold inert gas according to process step e, preferably to a conditioning temperature $T_K$ in the range from 500° C. to 300° C. The operating pressure $p_B3$ increases from initially (after reaction) less than 1 mbar (1 hPa) to normal pressure ($10^5$ Pa=1 bar). Then the workpiece 96 is moved through the sluice 40 into the chamber O4 and further cooled there in position 97 according to process step f first with inert gas, starting with temperatures of at most 300° C. also with air to room temperature. The finished workpiece 98 can then be discharged through the sluice 50.

Of course, before the next workpiece 95 is transferred into the chamber O3 for the after reaction, this chamber O3 is evacuated again to the operating pressure $p_B3$.

In the process according to the invention, in an embodiment with four chambers a residence time of the workpieces in the chambers O1 to O4 of three minutes to twenty minutes each has proven favorable.

The process according to the invention ensures that the workpieces 95 which have been moved into the chamber O2 for siliconization are always brought to the operating temperature prevailing in O2, that the operating pressure in O2 is always maintained and that especially the amount of silicon available for infiltration is always sufficient. This uniformity of pressure and temperature in the siliconization step has proven important for achieving a constant product quality. Another advantage is that the workpieces are not cooled in contact with the silicon bath, thus preventing the pores formed by the contraction of the volume of the silicon when it cools from being filled by silicon which has been intaken afterwards. It is the uniform temperature that primarily enables the embodiment with flat contact and easy detachment of the workpiece from the flat part of the jacket surface by continuing to turn the roll wicks.

It is of course possible, instead of pure silicon, to also use alloys or liquid mixtures of silicon with one or more other elements for infiltration. In particular, loading materials of iron (in a percent by mass of up to 6% in the mixture), refractory metals such as chromium, molybdenum, tungsten, zirconium (in a percent by mass of up to 3% each in the mixture) and of manganese, aluminum, cobalt and nickel (in a percent by mass of up to 3% each in the mixture), have proven effective.

The invention claimed is:

1. A method of forming a silicon carbide workpiece from a unitary porous carbon workpiece devoid of appendages, comprising:
    advancing said porous workpiece along a line of travel in a chamber provided with a bath of molten silicon and an inert atmosphere, heated to a selected temperature; and
    transferring molten silicon from said bath to said porous carbon workpiece as it advances along said line of travel, by means of a rotatable member having an outer layer sequentially submersible in said bath and engageable with a surface of said workpiece, formed of a material functional to absorb molten silicon upon immersion in said bath and to infuse absorbed molten silicon into said porous carbon workpiece upon contact therewith, causing said infused silicon to react with said porous carbon workpiece to form a silicon carbide workpiece.

2. The method according to claim 1 including:
    preheating said porous carbon workpiece to a temperature lower than said selected temperature, prior to admitting said workpiece to said chamber;
    holding said silicon carbide workpiece in a chamber provided with an inert atmosphere and heated to a temperature between said selected temperature and room temperature to allow for a completion of the reaction forming silicon carbide and relieve any stress resulting therefrom; and
    cooling said silicon carbide workpiece to room temperature.

3. The method of claim 1 including transferring said molten silicon with a rotatable member having a rounded workpiece engaging surface.

4. The method of claim 1 including transferring said molten silicon with a rotatable member having a polygonal cross-sectional configuration with rounded intersections of adjoining planar surfaces thereof.

5. The method of claim 1 including monitoring the amount by weight of the molten silicon transferred from said bath to said workpiece.

6. The method of claim 1 wherein said workpiece engageable rotatable member engages said workpiece in pressing relation to transfer and infuse said molten silicon into said porous workpiece.

\* \* \* \* \*